Figure 2:
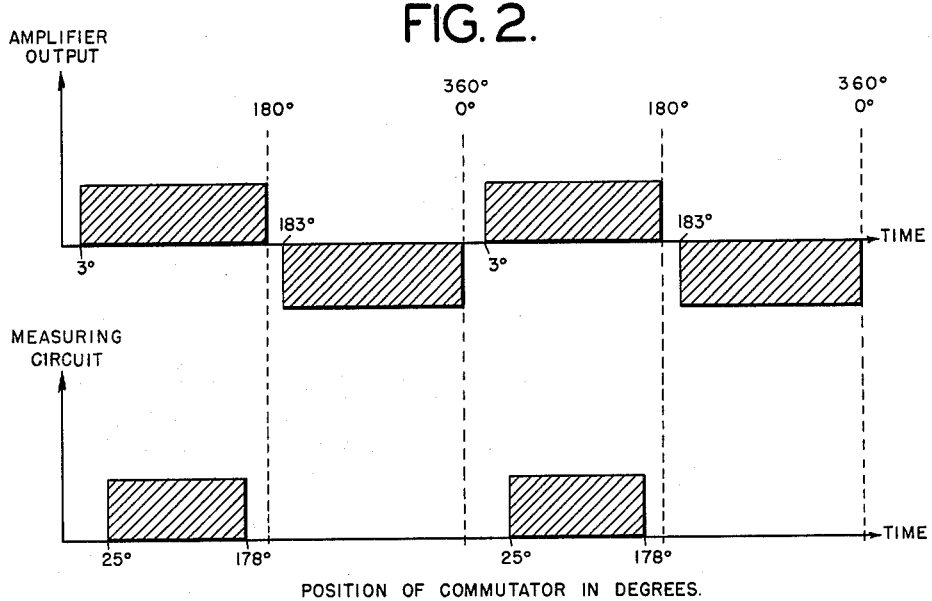

April 24, 1956 M. C. FERRE 2,743,414.
METHODS AND MEANS FOR PREVENTING DETERIORATION
OF ELECTRODES IN MEASURING SYSTEMS UTILIZING
UNIDIRECTIONAL ELECTRICAL SIGNALS
Filed May 27, 1952

INVENTOR.
MAURICE C. FERRE.

BY
Campbell, Brumbaugh, Free & Graves his ATTORNEYS.

United States Patent Office 2,743,414
Patented Apr. 24, 1956

2,743,414

METHODS AND MEANS FOR PREVENTING DETERIORATION OF ELECTRODES IN MEASURING SYSTEMS UTILIZING UNIDIRECTIONAL ELECTRICAL SIGNALS

Maurice C. Ferre, Ridgefield, Conn., assignor to Schlumberger Well Surveying Corporation, Houston, Tex., a corporation of Delaware Application May 27, 1952, Serial No. 290,306

7 Claims. (Cl. 324—1)

This invention relates to methods and means for preventing deterioration of electrodes incorporated in systems utilizing unidirectional electrical signals. More particularly the invention is concerned with preventing electrode deterioration in such systems when the electrodes must be immersed in electrically conducting fluids and when the electrodes are of the non-polarizable type, for example.

It is well known that direct current flow through an electrode immersed in an electrically conducting medium is affected by a phenomenon known as polarization and that measuring circuits employing such electrodes will reflect values of the parameter which it is desired to measure as well as the so called "overvoltage" which is caused by polarization.

Electrodes which are substantially non-polarizable are often utilized to minimize these undesirable effects. Non-polarizable electrodes which accommodate unidirectional signals for any appreciable length of time are, however, subject to deterioration which ultimately changes radically their electrical characteristics. In the case of oil well logging operations this can result in high operational costs and occasional spurious readings.

It is, therefore, an object of the present invention to provide methods and means for preventing the deterioration of electrodes as used in systems involving unidirectional electrical signals of extended duration.

Another object of the invention is to provide methods and means for measuring spontaneous potentials in wells drilled into the earth whereby the accuracy of the measurements over a long period of operation is assured and whereby the electrode life is increased.

These and other objects of the invention may be attained, for example, in a measuring system in which at least one electrode is adapted to be immersed in an electrically conducting fluid to pass first electrical signals and another electrode is immersed in the fluid to pass electrical signals which are influenced by the presence of the first electrode and its signals. In certain systems, such for example as might be used in the measurement of spontaneous potentials in a well drilled into the earth and filled with a column of electrically conducting muds, the first signals are applied by a power circuit to the conducting muds around the measuring electrode in form of a direct current which may be adjusted at a value which will cause a measuring circuit, including the second electrode, to indicate "selective" or "static" spontaneous potentials. Such systems are disclosed and claimed in the copending application Serial No. 60,872, filed November 19, 1948, and in the U. S. Patent No. 2,592,125 and granted April 8, 1952.

In accordance with the present invention electrical signals are applied to the first electrode in the form of a square wave having an average value of zero and a half cycle value which will cause the desired parameter to be indicated by the measuring circuit. The measuring circuit is connected so as to be rendered operative only during half cycle intervals so that it always will indicate the desired parameter. Since the electrode in the power circuit passes alternating signals, there will be no destructive effect due to deterioration or build-up on the electrode and its useful life will be materially extended. Also, since the total current passed by the electrode of the measuring circuit in a given direction will be decreased, its work life will also be increased.

Figure 1:
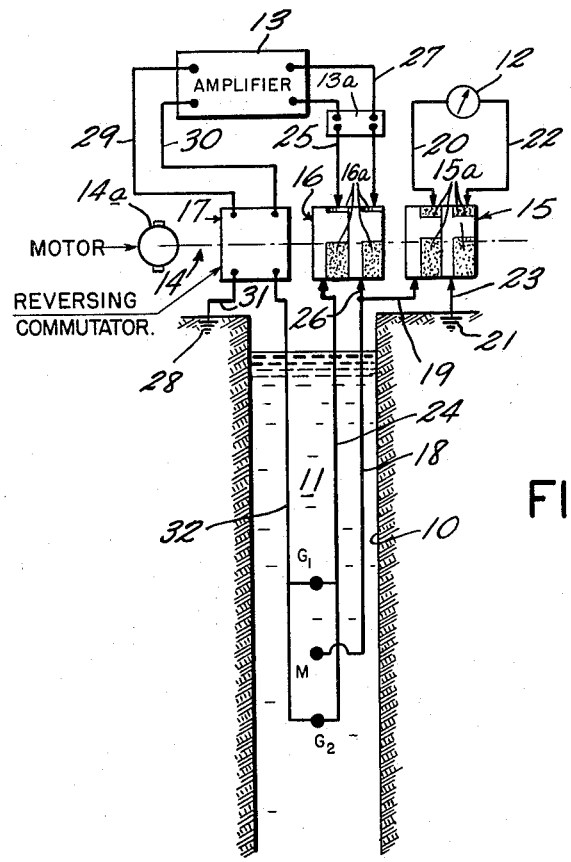

A better understanding of the invention and its various objects and advantages will be had by referring to the following description read in conjunction with the accompanying drawings in which:

Figure 1 shows in schematic form a measuring system useful in well logging operations and incorporating the present invention; and Figure 2 is a graph showing the timing cycle for the operation of the electrical components shown in Figure 1.

It should be understood that the methods and means for preventing the deterioration of electrodes in accordance with the present invention are applicable to any system wherein it is desired to make a current or potential measurement only when current is flowing in one direction. Particularly is the present invention useful when one of the potential measuring electrodes is simultaneously used as a current electrode and is immersed in an electrically conductive medium.

For purposes of illustration the invention is shown as embodied in a multiple electrode system useful in obtaining indications of selective or static spontaneous potentials naturally occurring in earth formations traversed by a bore hole such as described in the said copending application and U. S. patent.

Referring to Figure 1, the invention is shown as embodied in a logging apparatus comprising a plurality of electrodes M, $G_1$, and $G_2$ disposed in a bore hole 10 containing a column of electrically conducting liquid 11. Each electrode is preferably of the non-polarizable type, although it will be understood that conventional lead electrodes might be used.

The surface equipment may include a potential indicating instrument 12, preferably of the recording type, current supplying means 13, such as an amplifier, for example, and, in accordance with the invention, a switch arrangement designated generally by the numeral 14. The switch arrangement 14 is for purposes of illustration shown as comprising a commutator having three separate switch sections 15, 16 and 17, and driven by a motor 14a. The switch section 15 is preferably arranged to render the indicating instrument operative only during preestablishd intervals; the section 16 is arranged to control the input signal to the current supplying means; and the section 17 is arranged to reverse the direction of current flow from the current supplying means. The surfaces of the switch sections 15 and 16 are electrically conducting except for insulating segments 15a and 16a, respectively, which control the intervals during which the indicating instrument 12 and current supplying means 13 are not energized from the bore hole, the circuits being open when brush contacts are in engagement with the insulating segments. In Figure 1 of the drawing the switch sections 15 and 16 are to be regarded as developed commutator sections arranged to establish phase and time relationships described more fully below.

The electrode M is a potential measuring electrode and is connected to one terminal of the indicating instrument 12 through a circuit including an insulated conductor 18, conductor 19, the switch section 15 and conductor 20. The other side of the indicating instrument 12 is connected to ground at 21 through a circuit including a conductor 22, the switch section 15 and a conductor 23. Thus the instrument 12 will, when connected, measure the potential between the electrode M and ground at 21.

It will be assumed, for explanatory purposes, that the apparatus is to be used to log the static spontaneous potential, although it will be understood that, if desired, selective spontaneous potentials might be logged.

In order to measure the static spontaneous potential, the potential differences between the electrode M and each of the electrodes $G_1$ and $G_2$ are adjusted as required to maintain the potential difference at substantially zero. This adjustment is accomplished in the system disclosed in Figure 1 by emitting currents of suitable intensity into the bore hole liquid 11 from the electrodes $G_1$ and $G_2$. To do this the electrodes $G_1$ and $G_2$ are connected together by an insulated conductor 24 which passes up the bore hole to the switch section 16 and then to one input terminal of the current supplying means 13 through a conductor 25. The electrode M is connected to the other input terminal of the current supplying means 13 through a circuit including the conductor 18, a conductor 26, the switch section 16 and a conductor 27.

It will be understood, therefore, that the input to the current supplying means 13 is the potential difference between the electrodes $G_1$, $G_2$ and the electrode M.

The output of the current supplying means 13 is connected between a ground connection at 28 and the electrodes $G_1$ and $G_2$. In accordance with the present invention this is done through the reversing switch section 17, the output terminals being connected to this switch section by conductors 29 and 30 and the switch section in turn being connected to the ground at 28 and to the electrodes $G_1$ and $G_2$ by conductors 31 and 32, respectively.

To describe the operation of the apparatus it will be assumed for the moment that the switch arrangement 14 is not in the circuit. Any potential due to spontaneous currents between the electrodes $G_1$, $G_2$, and the electrode M will then be communicated directly to the input of the current supplying means 13. A responsive current from the output of the current supplying means 13 is passed back down the bore hole to the electrodes $G_1$ and $G_2$, and is of such polarity and magnitude as to oppose the flow of naturally occurring currents in the bore hole liquid so as to reduce and maintain substantially at zero the potential difference between the electrodes $G_1$, $G_2$, and M.

The electrode M will then measure only the static spontaneous potential of the formation, this measurement indicating the potential between electrode M and the remote reference potential of ground at 21.

Since the electrodes $G_1$ and $G_2$ must pass a relatively large current as well as serve as potential measuring electrodes, they are subject to deterioration if direct currents are passed through them for any appreciable length of time, regardless of whether or not they are of the so-called non-polarizable type. Such destructive action is obviated by application of the present invention, however, by passing essentially an alternating current through the electrodes $G_1$ and $G_2$. To this end the switch arrangement 14 is constructed to cause A. C. to be emitted from the electrodes $G_1$ and $G_2$ which has an average value of zero and also to cause the indicating instrument 12 to be operative only when current of desired polarity is being emitted from the electrodes $G_1$ and $G_2$, as shown graphically in Figure 2. It will be understood that the value of the current emitted during the desired half cycles is of such value that the instrument 12 will indicate static spontaneous potentials.

Effectively, the measuring circuit will give the same indications as though a continuous direct current were being passed through the electrodes $G_1$ and $G_2$. Of course, the indicating instrument 12 has sufficient inertia so that it will not be affected by the periods during which it is not connected in the measuring circuit.

In order to attain an average value of zero for the alternating current in the electrodes $G_1$ and $G_2$, the switch sections 16 and 17 are operated in synchronism in the following manner:

The switch section 16 may be in the nature of a circuit breaking switch whereby the potential difference between the electrodes M and $G_1$, $G_2$ is impressed across the input terminals of the current supplying means 13 periodically, that is, the circuit is opened and closed for equal periods of time during each complete cycle of operation of the switch section 16. The current emitting device 13 is provided with an input smoothing circuit 13a such for example as a conventional R-C smoothing network which gives an average D. C. input signal having a value which is a function of the voltage difference between the electrodes M, $G_1$ and $G_2$. The output of the current supplying means is passed through the reversing switch 17 which is so arranged in relation to the switch section 16 that current of the polarity and magnitude necessary to bring the potential difference between the electrodes M, and $G_1$, $G_2$ to zero is supplied only during the intervals that the electrodes M and $G_1$, $G_2$ are connected to the input of the current supplying means. It will be understood, therefore, that the system will be degenerative for this portion of the cycle and will operate always to bring the potential difference between the electrodes to substantially zero.

When the input to the current supplying means is cut off by the switch section 16, the switch section 17 will reverse the polarity and direction of current flow between the electrodes $G_1$, $G_2$ and the ground connection 28. Since there will be no input to the current supplying means 13 during this interval of reversed polarity the system will not become regenerative. Also, since the current output during this interval is, by virtue of the smoothing circuit at the input of the current supplying means, substantially equal to the current output during the preceding interval, the average value of the current emitted from the electrodes $G_1$ and $G_2$ will be zero over a given cycle of operation.

By reading Figures 1 and 2 of the drawing together, it will be seen that the switch section 15 is also operated in synchronism with the switch sections 16 and 17 so that the measuring circuit of the indicating instrument 12 will be closed only during intervals in which the system is degenerative to bring the potential difference between the electrodes M and $G_1$, $G_2$ to zero. Thus the static spontaneous potential will be indicated by the instrument 12.

It will be understood that non-polarizable type electrodes may be employed for the current emitting electrodes $G_1$ and $G_2$ without being subject to the destructive effects of direct current. The measuring electrode M will also be less subject to deterioration because the total current accommodated will be less than would be the case if it were to conduct D. C. continuously.

It will be seen in Figure 2 that the switch sections are so arranged that the measuring circuit will not be closed until an appreciable time after the current output of proper polarity is effected in the electrodes $G_1$ and $G_2$. Also, it will be seen that the measuring circuit is opened an appreciable time before the current output of that polarity is completed. Such an arrangement will insure that any transients set up in the current supplying means 13 will have died down before measurements are taken.

It will be understood that the present invention may be embodied in any of the several selective and static spontaneous potential measuring systems disclosed in the said copending application and patent. In this connection it should be understood that the current which is emitted from one or more power electrodes, such as the electrodes $G_1$ and $G_2$, is used to adjust to a reference value the potential between two points in the bore hole, such for example as the measuring electrode M or a nearby electrode and a reference point, and that this reference point may be either the power electrodes themselves, as is the case in the system described in detail above, or additional measuring electrodes which may be interposed in the electrode array at points spaced from the power electrodes, as described in the said copending application and patent.

The spontaneous potentials are measured between two points, at least one of which will be in the vicinity of the emitted current. If, for example, static spontaneous potentials are to be measured, the potential measurements will be taken between a point in the electrode array, such for example as the electrode M and a remote reference point such as the ground connection 21, the potential between the measuring electrode M and the power electrode $G_1$ or a nearby electrode, having been adjusted to zero.

In measuring selective spontaneous potentials, on the other hand, both measuring points will be disposed in the bore hole in the vicinity of the emitted current. Referring to the drawing of the present application, for example, selective spontaneous potentials might be measured between a reference point such as the power electrode $G_1$ or a nearby electrode, and the measuring electrode M, the potential of the two electrodes $G_1$ and $G_2$ having been previously adjusted to a desired reference value with respect to a reference point, all as disclosed in the said pending application.

It will be understood also that the embodiment of the invention described above is for purposes of illustration and that the invention may be used in other systems in which direct current or potential measurements are to be made using one or more electrodes which are adapted to be immersed in an electrically conducting liquid. Further, the various components disclosed herein may be modified without departing from the scope of the invention. Thus, for example, other types of switch arrangements than commutators might be used for reversing the current flow from the electrodes $G_1$ and $G_2$ and for rendering the indicating instrument alternately operative and inoperative.

It will also be understood that various other types of current supplying means may be used in lieu of a high transconductance amplifier. Thus for example, a servomechanism such as disclosed in the pending application Serial No. 248,384, filed September 26, 1951 by George K. Gillies, for "Servomechanism Control System" might be used to advantage.

The illustrated embodiment of the invention should not, therefore, be regarded as limiting in any way the scope of the following claims.

I claim:

1. In a method of investigating earth formations traversed by a bore hole containing an electrically conducting liquid, the steps of emitting current in the liquid in the bore hole in periodically reversing directions, the current emitted for one of the directions of current flow being counter to the flow of naturally occurring currents in a portion of the bore hole, and obtaining indications only during the emission of current in said one direction of the potential difference between a point in the bore hole portion and a reference point other than said point in the bore hole.

2. In a method for investigating earth formations traversed by a bore hole containing a column of relatively conducting liquid having naturally occurring electrical currents flowing therein, the steps of disposing an electrode in the liquid in the bore hole, emitting A. C. from the electrode having an average value of substantially zero and a value during half cycles of one polarity which adjusts to a reference value the potential difference between two points spaced apart longitudinally in the bore hole and at least one of which is disposed in the vicinity of the emitted current, and obtaining indications, only while current of said one polarity is being emitted from the said one electrode, of the potential difference between a reference point and a point in the vicinity of the location where the potential difference has been adjusted to the reference value, the emitted current of said one polarity being counter to the naturally flowing currents in the bore hole at the last named point.

3. In a method for investigating earth formations traversed by a bore hole containing a column of relatively conducting liquid, the steps of disposing in the liquid in the bore hole an electrode array comprising at least first and second longitudinally spaced-apart electrodes and a third electrode disposed between the first and second electrodes, emitting an alternating current having an average value of substantially zero from the first and second electrodes, adjusting the emitted alternating current to adjust the potential difference between the third electrode and a reference point to a reference value during half cycles of one polarity, the emitted current of said one polarity being counter to the flow of naturally occurring currents in the bore hole adjacent the third electrode, and obtaining indications of the potential difference between the third electrode and a reference point only during the emission of current of said one polarity from the first and second electrodes.

4. In apparatus responsive to unidirectional electrical signals in an electrically conducting medium, first electrode means adapted to be disposed in the electrically conducting medium, a source of electrical signals of alternating polarity connected to said first electrode means, a second electrode adapted to be disposed in the said medium to be influenced by the signals emitted from the first electrode means, signal responsive means connected between the second electrode and a reference point, and means for rendering said signal responsive means operative only during the impressing of half cycles of one polarity from said source on said first electrode means, the signals of said one polarity opposing the unidirectional signals.

5. In apparatus responsive to unidirectional electrical signals in an electrically conducting medium, first electrode means adapted to be disposed in the electrically conducting medium, a source of electrical signals of alternating polarity connected to said first electrode means, said source comprising a generator of direct signals of one polarity and having reversing switch means connected in its output circuit, a second electrode adapted to be disposed in said medium to be influenced by the signals emitted from the first electrode means, signal responsive means connected between the second electrode and a reference point, and switching means connected in series with said signal responsive means for making and breaking the circuit between the second electrode and the reference point, and means for operating said reversing switch means and said switching means in synchronism to cause the signal responsive means to be operative only during the impressing of half cycles of one polarity on said first electrode by said source, the signals of said one polarity opposing the unidirectional signals.

6. In apparatus as set forth in claim 5, said source of electrical signals comprising a generator of direct signals responsive to input control voltages, means for connecting the second electrode and a reference point to the input of said generator to impress the voltage difference between the second electrode and the reference point thereacross, said system being connected as a degenerative circuit when the output from the generator to the first electrode means is of one polarity, thereby to bring the voltage difference between the second electrode and the reference point to a reference value, second switching means connected in series with the input of said generator to connect the input voltage to the generator only when the system is degenerative, means to supply an input voltage to the generator during intervals when said second switching means is not connecting the input voltage from the second electrode and the reference point to the generator, and means for operating the second switching means in synchronism with the said reversing switch means and said switching means to cause the voltage between the second electrode and the reference point to be impressed periodically across the input of the generator and to cause the same signal to be introduced to the signal responsive means during but not exceeding the same intervals.

7. In an electrical logging system for use in bore holes filled with electrically conducting liquid, an electrode array comprising at least two electrodes adapted to be disposed in the liquid in the bore hole in longitudinally spaced relationship, voltage measuring means connected in a circuit between one electrode and a reference point, a current source responsive to pulsating direct signals to provide a continuous direct current output, said current source having its output connected to the other electrode to cause current to be emitted therefrom to bring the voltage difference between said one electrode and a reference point to a reference value and having its input connected to said one electrode and a reference point to receive an input signal which is a function of the voltage difference therebetween, whereby the output current from the source is a function of said voltage difference, reversing switch means between the output of the current source and the other electrode for periodically reversing the direction of current flow in the other electrode, second switch means in the input to the current source, third switch means in the circuit including the measuring device, and means for operating said reversing, second, and third switch means in synchronism to establish alternating current flow having an average value of substantially zero in the other electrode, to open and close the input circuit to the current source and to open and close the circuit to the measuring device, the input circuit and the measuring circuit being closed when the current flow in the other electrode is in a direction to render the system degenerative and opened when current flow is in the opposite direction.

References Cited in the file of this patent

UNITED STATES PATENTS

| | | |
|---|---|---|
| 1,346,057 | Reardon | July 6, 1920 |
| 2,046,436 | Wascheck | July 7, 1936 |
| 2,294,395 | Evjen | Sept. 1, 1942 |
| 2,592,125 | Doll | Apr. 8, 1952 |